(12) United States Patent
Benedetto

(10) Patent No.: US 10,287,190 B2
(45) Date of Patent: May 14, 2019

(54) ELECTRODE FOR ELECTROCHEMICAL ABATEMENT OF CHEMICAL OXYGEN DEMAND OF INDUSTRIAL WASTES

(71) Applicant: INDUSTRIE DE NORA S.P.A., Milan (IT)

(72) Inventor: Mariachiara Benedetto, Milan (IT)

(73) Assignee: INDUSTRIE DE NORA S.P.A., Milan (IT)

( * ) Notice: Subject to any disclaimer, the term of this patent is extended or adjusted under 35 U.S.C. 154(b) by 811 days.

(21) Appl. No.: 14/374,267

(22) PCT Filed: Feb. 7, 2013

(86) PCT No.: PCT/EP2013/052403
§ 371 (c)(1),
(2) Date: Jul. 24, 2014

(87) PCT Pub. No.: WO2013/117630
PCT Pub. Date: Aug. 15, 2013

(65) Prior Publication Data
US 2014/0353168 A1    Dec. 4, 2014

(30) Foreign Application Priority Data
Feb. 7, 2012    (IT) ............................ MI20120A0158

(51) Int. Cl.
| | |
|---|---|
| C02F 1/461 | (2006.01) |
| C02F 1/467 | (2006.01) |
| C02F 9/00 | (2006.01) |
| A45D 44/08 | (2006.01) |
| C02F 1/46 | (2006.01) |
| C02F 1/463 | (2006.01) |
| C02F 101/30 | (2006.01) |
| C02F 101/32 | (2006.01) |
| C02F 101/34 | (2006.01) |

(52) U.S. Cl.
CPC ............ *C02F 1/4674* (2013.01); *A45D 44/08* (2013.01); *C02F 1/46109* (2013.01); *C02F 9/00* (2013.01); *C02F 1/4602* (2013.01); *C02F 1/463* (2013.01); *C02F 2001/46138* (2013.01); *C02F 2001/46142* (2013.01); *C02F 2001/46157* (2013.01); *C02F 2101/301* (2013.01); *C02F 2101/32* (2013.01); *C02F 2101/325* (2013.01); *C02F 2101/34* (2013.01); *C02F 2201/4613* (2013.01); *C02F 2201/46105* (2013.01); *C02F 2209/08* (2013.01)

(58) Field of Classification Search
CPC .......... C02F 1/463; C02F 1/465; C02F 1/467; C02F 1/4672; C02F 1/4674
See application file for complete search history.

(56) References Cited

U.S. PATENT DOCUMENTS

| | | | | |
|---|---|---|---|---|
| 3,278,404 A | * | 10/1966 | Cotton | ................ C25B 11/0431 204/196.3 |
| 3,410,784 A | * | 11/1968 | Hanlon | .................. C25B 9/063 204/268 |
| 4,070,504 A | | 1/1978 | Bianchi et al. | |
| 4,401,544 A | * | 8/1983 | Seto | ........................ C25B 11/02 204/288 |
| 4,995,550 A | | 2/1991 | Appl et al. | |
| 5,225,061 A | | 7/1993 | Westerlund | |
| 2003/0098247 A1 | | 5/2003 | Nakamura et al. | |
| 2006/0000784 A1 | | 1/2006 | Khudenko | |
| 2006/0254930 A1 | | 11/2006 | Martinie et al. | |
| 2009/0008267 A1 | * | 1/2009 | Del Signore | ........... C02F 1/281 205/744 |
| 2011/0108436 A1 | * | 5/2011 | Gulla | .................... C02F 1/4672 205/688 |

FOREIGN PATENT DOCUMENTS

| | | |
|---|---|---|
| CA | 1143335 | 3/1983 |
| EP | 0107135 | 5/1984 |
| WO | 2004002900 | 1/2004 |

OTHER PUBLICATIONS

International Search Report issued in PCT Application No. PCT/EP2013/052403.
International Preliminary Report on Patentability issued in PCT Application No. PCT/EP2013/052403.

* cited by examiner

*Primary Examiner* — Louis J Rufo
*Assistant Examiner* — Salil Jain
(74) *Attorney, Agent, or Firm* — Lucas & Mercanti, LLP

(57) ABSTRACT

The invention relates to an electrode suitable for decreasing the chemical oxygen demand of waste-water comprising: a) a permanent component; and b) a sacrificial component arranged face-to-face and releasably attached to the permanent component and in electrical contact therewith, said permanent component consisting of a Substrate of a valve metal equipped with a catalytic coating containing noble metals or oxides thereof, said sacrificial component containing elemental iron. Further the invention relates to a method for abatement of the chemical oxygen demand in an aqueous waste containing oily compounds, glycols or waxes, optionally consisting of a foundry waste, by an electrolytic process involving anodic chlorine evolution in the presence of trivalent iron. Chlorine evolution may be carried out on the surface of an anode consisting of a catalytically activated-valve metal permanent component coupled to an iron-containing sacrificial component.

15 Claims, No Drawings

ELECTRODE FOR ELECTROCHEMICAL ABATEMENT OF CHEMICAL OXYGEN DEMAND OF INDUSTRIAL WASTES

This application is a U.S. national stage of PCT/EP2013/052403 filed on Feb. 7, 2013 which claims the benefit of priority from Italy Patent Application No. MI20120A000158 filed Feb. 7, 2012, the contents of each of which are incorporated herein by reference.

FIELD OF THE INVENTION

The invention relates to an electrochemical method of abatement of chemical oxygen demand of an aqueous waste and to an electrode suitable therefor.

BACKGROUND OF THE INVENTION

The invention relates to an electrochemical method of abatement of chemical oxygen demand in foundry residues or other industrial wastes containing non aqueous components such as oily compounds, glycols or waxes, which make the relevant treatment difficult and expensive. Foundry waste-waters require treatments aimed at abating a remarkable amount of organic substances accumulated during the various process steps in order to allow their reuse or disposal.

The typical waste of an aluminium foundry, which represents one of the most complex and common industrial cases, consists of tap or well-water polluted by release agents (such as alkylaryl siloxanes and ethoxylated polyethylene waxes), hydraulic fluid normally consisting of glycol mixtures (for instance ethylene-propylene glycol), emulsifying agents, paraffin mineral oils, synthetic oils (for instance carboxylic ester-based oils), antifoams (for instance silicone-type ones), oxidation inhibitors (such as boric amide), biocides, complexing agents (such as EDTA) besides dust particles and fat residues. The chemical oxygen demand (COD) of a foundry residue is therefore not only very high (with typical values of 40,000 mg/l) but also deriving from a very complex mixture of components. In order to reduce COD to values allowing the reuse of such waste stream as process water (i.e. values not higher than 1,000 and preferably lower than 500 mg/l of oxygen) a combination of treatments of various kinds can be used, with a series of associated drawbacks. As it could be verified, the treatment by thermocompression in suitable concentrators, which has the advantage of not requiring the employment of particularly qualified staff for its operation, is not sufficient to bring COD below the required threshold and is inevitably affected by a drag of components such as hydrocarbons, glycols and surfactants in the condensate, requiring a post-treatment. In addition or as an alternative, it is possible to carry out a combined treatment of deoiling, ultrafiltration and reverse osmosis, which conversely has to be managed by dedicated personnel especially in the extremely delicate stage of rinsing of the relevant membranes. A combination of chemico-physical and biological processes often lends good results but is made difficult by the variability in the concentration of pollutant species to be treated, besides entailing a heavy handling of chemical reactants and the need for specialised staff. All of these problems finally apply to chemical oxidation treatments with Fenton's reagent followed by ultrafiltration and reverse osmosis which nevertheless, if accurately managed, can provide a high quality water.

For some specific applications it is known that electrochemical waste-water treatments, sometimes attractive for the simplicity of the process and for the very competitive costs, may be taken into consideration; most of COD components in a foundry waste could for instance be abated by oxidation on the surface of an anodically-polarised electrode, after a possible addition of salts to the waste for the sake of imparting a sufficient electrical conductivity. On the other hand, the untreated waste contains pollutant species liable to form pitches and oligomers which would lead to the quick fouling of the electrode surface and its consequent deactivation. Wishing to make an attempt at an electrochemical treatment on a foundry waste, a preliminary deoiling step would at least be required, sensibly decreasing the overall process competitiveness.

It has thus been identified the need of providing a method of treatment of aqueous wastes containing oily compounds, glycols or waxes, in particular of wastes coming from foundry processing, overcoming the inconveniences of the prior art.

SUMMARY OF THE INVENTION

Various aspects of the invention are set out in the accompanying claims.

Under one aspect, the invention relates to a method for decreasing the chemical oxygen demand of a waste-water containing oily compounds, glycols or waxes, comprising a step of electrolysis of the waste-water with anodic evolution of chlorine in the presence of trivalent iron. The inventors surprisingly noticed that it is possible to carry out the electrochemical oxidation of wastes typical of foundry operations or similar with no fouling of electrodes and cells employed by adding, if necessary, an appropriate amount of chloride ions to the waste to be treated—indicatively 1 to 10 g/l, for instance 3 to 5 g/l—and by means of a Fe (III) ion addition, so as to combine the oxidising action of nascent chlorine on an anode surface with the flocculating action of trivalent iron. The presence of iron was found to be fundamental in particular in a primary step of the electrolysis, when it is necessary to prevent the degeneration of polymerisable substances, such as siloxanes, to a rubbery deposit; in a subsequent secondary step, the electrolysis may be advantageously carried out in the absence of iron. In this case, it may be advisable to carry out a waste settling and/or filtration step between the two electrolysis steps in a suitable unit outside the electrolytic cell. In one embodiment, after the secondary electrolysis of the waste a final purification step may be carried out by reverse osmosis, whenever it is desirable to reduce the outlet COD value to an extreme extent and to abate the salt concentration, favouring the recycling of the depurated water to the original process. The disclosed method provided excellent experimental results with various types of foundry wastes and in general with waste-waters containing siloxanes, polyethylene waxes, glycols, mineral oils, synthetic oils, silicone antifoams, non-silicone antifoams, surfactants, EDTA or boric amide.

Under another aspect, the invention relates to an electrode particularly suitable as anode for electrochemical oxidation of organic compounds in waste-waters aimed at decreasing the chemical oxygen demand thereof, consisting of a permanent component and a sacrificial component releasably attached thereto and in electrical contact therewith, wherein the permanent component comprises a substrate of a valve metal, for instance titanium optionally alloyed, and a catalytic coating containing noble metals or oxides thereof, for instance oxides of ruthenium and/or iridium optionally in admixture with oxides of titanium and/or tantalum and the sacrificial component contains elemental iron. This has the advantage of allowing carrying out the electrolysis with no external addition of trivalent iron salts, obtaining the required amount of iron by the electrolytic dissolution of the sacrificial component, which is released into solution in trivalent form in the presence of nascent chlorine. The releasable sacrificial component further allows easily carrying out the electrolysis in two stages, with an optional step of filtration and/or settling of flocculated oily or waxy components in-between, providing for its removal before the secondary electrolysis step. The term "releasably attached" is used herein to indicate that the sacrificial component is a separate piece coupled to the permanent component by mechanical fastening and configured to be intentionally detached by a simple manual operation; in one embodiment, the sacrificial component consists of a metal mesh or wire hooked to the permanent component, e.g. hanged to the top side thereof.

In one embodiment, the sacrificial component is substantially coextensive with the permanent component and releasably attached thereto in a face-to-face configuration.

Under another aspect, the invention relates to an electrochemical system for decreasing the chemical oxygen demand of industrial waste-waters comprising an electrolytic cell, either unseparated or subdivided into two compartments by means of a separator, containing an electrode as hereinbefore described operating as anode and a valve metal or steel electrode operating as cathode. In one alternative embodiment, the invention relates to an electrochemical system for decreasing the chemical oxygen demand of industrial waste-waters comprising an electrolytic cell, either unseparated or subdivided into two compartments by means of a separator containing two electrodes as hereinbefore described, each of them being alternatingly polarised as anode and as cathode at periodic time intervals. This can have the advantage of eliminating or strongly reducing the possible fouling by lime-scales of the electrode during the cathodic cycle, allowing its dissolution during the following cycle of anodic operation. In one embodiment, the electrochemical system comprises a settling and/or filtration unit hydraulically connected to the electrochemical cell. In one embodiment, the electrochemical system comprises a reverse osmosis unit downstream the electrochemical cell.

Some of the most significant results obtained by the inventors are illustrated in the following examples, which are not intended to limit the extent of the invention.

EXAMPLE 1

4 liters of a foundry waste with a COD of 38,700 mg/l of oxygen (detected by spectrophotometry with a suitable kit), consisting of slightly more than 90% by volume of tap water with average total hardness of 32° F. and containing 0.15% by volume of alkyl aril siloxanes, 0.06% by volume of ethoxylated polyethylene waxes and minor amounts of the following contaminants:
  non ionic and anionic emulsifying agents
  ethylene/propylene glycol
  high viscosity (ISO VG 460) paraffinic mineral oil
  carboxyl ester-based synthetic oil
  silicone antifoam
  boric amide
  bacterial inhibitors
  EDTA
  typical foundry dirt (aluminium alloy dust, fats, environmental dust)

were added with 4 g/l of NaCl and 1 g/l of $Fe_2(SO_4)_3$ and fed to an electrochemical cell comprising an anode consisting of a 114 $cm^2$ titanium plate activated with a mixture of oxides of ruthenium, iridium and titanium, a cathode consisting of a non-activated titanium mesh of the same size and a separator consisting of a 0.2 mm thick polypropylene mesh, with an anode-to-cathode gap of 1 mm. The cell was operated at a current density of 500 $A/m^2$, recycling the electrolyte at a constant flow-rate of 400 l/h. The treatment was carried out monitoring the COD and chloride levels, the latter being constantly kept above 1 g/l by subsequent additions of salt (every 20 hours approximately). The test was discontinued after 130 hours, when the COD value attained, of about 900 mg/l of oxygen, showed no tendency to decrease any further while the cell voltage, until then stable around a value of 7.4 V, started increasing slightly.

After disassembling, the cell presented a consistent fouling of the cathodic surface and a partial clogging of the separator.

EXAMPLE 2

The test of example 1 was repeated with the same waste, added with sodium chloride and ferric sulphate as above, in an equivalent electrochemical cell except that it comprised two identical electrodes, both consisting of a 114 $cm^2$ titanium plate activated with a mixture of ruthenium, iridium and titanium oxides, one acting as the anode and one as the cathode. The electrode polarity was reversed every 60 minutes. The test was discontinued after 150 hours when the COD value attained, of about 700 mg/l of oxygen, showed no tendency to decrease any further. The cell voltage remained stable at 7.4 V during the whole test.

After disassembling, the cell presented a slight fouling of the electrodes and a partial clogging of the separator.

EXAMPLE 3

The test of example 2 was repeated with the same waste but with no external addition of ferric sulphate, in an equivalent electrochemical cell except that the two electrodes, both obtained from a 114 $cm^2$ titanium plate activated with a mixture of ruthenium, iridium and titanium oxides, had a wide mesh soft iron net secured thereto by mechanical hooking to the top edge of the plate. The electrode polarity was reversed every 60 minutes. The test was discontinued after 4 hours, after which the iron nets were detached from the activated titanium plates and the waste was subjected to filtration. The electrochemical treatment was then resumed and protracted for 63 hours more, with a cell voltage of 7.3 V, detecting a residual COD of 140 mg/l of oxygen, further decreased to 21 mg/l of oxygen upon reaching 200 hours of overall treatment.

After disassembling, the cell presented a slight fouling of the electrodes and a negligible clogging of the separator.

Counterexample 1

The test of example 1 was repeated with the same waste in an equivalent electrochemical cell, with no external addition of ferric sulphate. The test was discontinued after 110 hours when the cell voltage attained a value of 8 V from the initial 7.35 V, with a residual COD slightly above 900 mg/l of oxygen.

After disassembling, the cell presented a grey-coloured rubbery coating on the anodic surface, impossible to remove mechanically without damaging the catalytic activation, besides a consistent fouling of the cathodic surface and of the separator. Also the cell walls, which remained clean after the previous tests, showed evidence of a grey-coloured rubbery and sticky coating.

The previous description shall not be intended as limiting the invention, which may be used according to different embodiments without departing from the scopes thereof, and whose extent is solely defined by the appended claims.

Throughout the description and claims of the present application, the term "comprise" and variations thereof such as "comprising" and "comprises" are not intended to exclude the presence of other elements, components or additional process steps.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention before the priority date of each claim of this application.

The invention claimed is:

1. Electrode suitable for decreasing the chemical oxygen demand of waste-water comprising:
   a) a permanent component; and
   b) a sacrificial component arranged face-to-face and releasably attached to the permanent component and in electrical contact therewith,
   said permanent component consisting of a substrate of a valve metal equipped with a catalytic coating containing noble metals or oxides thereof, said sacrificial component containing elemental iron,
   wherein the elemental iron is dissolved during operation of the electrode for decreasing the chemical oxygen demand of waste-water, and
   wherein the electrode is an alternatingly polarizing electrode as an anode and as a cathode in an electrochemical cell for decreasing chemical oxygen demand of waste-water containing chlorides or added with chlorides.

2. The electrode according to claim 1 wherein said sacrificial component consists of a metal mesh or wire hooked to said permanent component.

3. The electrode according to claim 1 wherein said catalytic coating contains oxides of ruthenium and/or oxides of iridium in admixture with oxides of titanium and/or oxides of tantalum.

4. Electrochemical system for decreasing the chemical oxygen demand of industrial waste-water comprising an electrolytic cell containing:
   an electrode according to claim 1 operating as the anode, and
   an electrode of a valve metal or steel operating as the cathode.

5. Electrochemical system for decreasing the chemical oxygen demand of industrial waste-water comprising an electrolytic cell containing a pair of electrodes according to claim 1, each of them alternatingly polarized as anode and as cathode.

6. The system according to claim 4 comprising a settling and/or filtration unit hydraulically connected to said electrolytic cell.

7. The system according to any one of claim 4 comprising a reverse osmosis unit downstream said electrolytic cell.

8. Method for decreasing the chemical oxygen demand of a waste-water containing oily compounds, glycols or waxes, comprising:
   carrying out electrolysis of the waste-water with anodic evolution of chlorine in the presence of trivalent iron, thereafter carrying out the following sequential steps:
   a) optionally adding of salts to the waste-water up to reaching a chloride ion concentration of 1-10 g/l;
   b) performing primary electrolysis of the waste-water in said electrolytic cell of the electrochemical system according to claim 4 with evolution of chlorine on the surface of said permanent component and partial dissolution of said sacrificial component; and
   d) performing secondary electrolysis of the waste-water in said electrolytic cell of the electrochemical system after releasing said sacrificial component of said electrode.

9. The method according to claim 8, wherein the electrochemical system used in step b) comprises a settling and/or filtration unit hydraulically connected to said electrolytic cell, and wherein said method comprises the following step between steps b) and d):
   c) performing primary purification of the waste-water exiting said primary electrolysis in said settling and/or filtration unit.

10. The method according to claim 9; wherein the electrochemical system used in step b) comprises a reverse osmosis unit downstream said electrolytic cell, and wherein said method comprises the following step after step d):
    e) performing final purification of the waste-water exiting said secondary electrolysis in said reverse osmosis unit.

11. The method according to claim 8 wherein said waste-water is a foundry residue.

12. The method according to claim 8 wherein said waste-water contains one or more components selected from the group consisting of siloxanes, polyethylene waxes, glycols, mineral oils, synthetic oils, silicone antifoams, non-silicone antifoams, surfactants, EDTA and boric amides.

13. The system according to claim 5 comprising a settling and/or filtration unit hydraulically connected to said electrolytic cell.

14. The system according to claim 5 comprising a reverse osmosis unit downstream said electrolytic cell.

15. Method for decreasing the chemical oxygen demand of a waste-water containing oily compounds, glycols or waxes, comprising:
    carrying out electrolysis of the waste-water with anodic evolution of chlorine in the presence of trivalent iron, thereafter carrying out the following sequential steps:
    a) optionally adding salts to the waste-water up to reaching a chloride ion concentration of 1-10 g/l;
    b) performing primary electrolysis of the waste-water in said electrolytic cell of the electrochemical system according to claim 5 with evolution of chlorine on the surface of said permanent component and partial dissolution of said sacrificial component;
    d) performing secondary electrolysis of the waste-water in said electrolytic cell of the electrochemical system after releasing said sacrificial component of said electrode.

* * * * *